United States Patent [19]
Toba et al.

[11] Patent Number: 6,117,927
[45] Date of Patent: *Sep. 12, 2000

[54] METHOD FOR PRODUCING A RUBBER COMPOSITION

[75] Inventors: Tadashi Toba; Takashi Shimizu; Takashi Kitamura, all of Tokyo, Japan

[73] Assignee: Bridgestone Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/715,877

[22] Filed: Sep. 19, 1996

[30] Foreign Application Priority Data

Sep. 20, 1995 [JP] Japan ...................... 7-241904

[51] Int. Cl.⁷ ...................................... C08J 5/32
[52] U.S. Cl. ................. 524/261; 525/342; 525/105
[58] Field of Search ............. 524/261; 525/342, 525/105

[56] References Cited

U.S. PATENT DOCUMENTS 5,665,812  9/1997  Gorce et al. .................. 524/495

FOREIGN PATENT DOCUMENTS

| | | |
|---|---|---|
| 0002864 | 7/1979 | European Pat. Off. . |
| 0299074 | 1/1989 | European Pat. Off. . |
| 0661298 | 7/1995 | European Pat. Off. . |
| 62-227908 | 10/1987 | Japan . |
| 64-22940 | 1/1989 | Japan . |
| 1188501 | 7/1989 | Japan . |
| 3239737 | 10/1991 | Japan . |
| 7233217 | 9/1995 | Japan . |
| 853513 | 2/1996 | Japan . |
| 853576 | 2/1996 | Japan . |

OTHER PUBLICATIONS

Patent Abstracts of Japan, vol. 013, No. 479, Oct. 18, 1989, Jul. 27, 1989.

*Primary Examiner*—Peter D. Mulcahy
*Attorney, Agent, or Firm*—Sughrue, Mion, Zinn, Macpeak & Seas, PLLC

[57] ABSTRACT

A monomer such as butadiene monomer and/or styrene monomer is polymerized using an organic lithium initiator, and the active terminal of a (co)polymer thus obtained is modified with a specific modifier having reactivity with a silica surface, e.g., γ-glycidoxypropyl trimethoxysilane and γ-methacryloxypropyl trimethoxysilane, and then the terminally-modified (co)polymer is mixed with a silica in an organic solvent. The rubber obtained can be used in a tire tread and the like.

24 Claims, No Drawings

METHOD FOR PRODUCING A RUBBER COMPOSITION

BACKGROUND OF THE INVENTION

1. Field of the Invention

The present invention relates to a method for producing a rubber composition into which a silica is incorporated, more specifically, to a method for producing a rubber composition which has a satisfactorily low hysteresis loss (low rolling resistance, low gas mileage) and well-balanced physical properties such as break characteristics, wearing resistance and processability and which is suitable to use in a tire tread and the like.

2. Description of Related Art

Recently, tensile stress and break characteristics of silica-incorporating rubber compositions have been attempted to be improved. With development of increasingly advanced performance of tires, a rubber composition is required which has well-balanced physical properties such as processability and break characteristics as well as a satisfactorily low hysteresis loss for use as a tire tread rubber.

In an attempt to reduce the hysteresis loss, a modified rubber having a specific structure is employed, as a major component, in a carbon filler-containing rubber formulation. However, simultaneous achievement of high grip performance in a rainy day and low hysteresis loss is very difficult. In order to solve such problems, some rubber compositions have are known in which white carbon such as silica is employed as a filler in addition to carbon black, or only white carbon is employed.

For example, a rubber composition containing a polymer whose terminals are modified with a silane compound and a silica is reported (e.g., JP-B No. 52-5071, JP-A No. 56-104906, JP-A No. 62-50346, JP-A No. 62-227908). However, such polymer contains an insufficient amount of a residual alkoxy group and is a polymer in which only one side of the terminals is modified. Thus, the reinforcing effect and dispersing effect on fillers such as a silica, and eventually, the mechanical property improving effect are not satisfactory. Furthermore, such polymer, even when, for example, dilithium as an initiator is used (JP-A No. 62-227908), has both terminals modified with alkoxysilane. They have coupling capability, so that the molecular weight of the polymer becomes difficult to control practically and the viscosity of the polymer cement before and after modification becomes higher, resulting in problems with regard to steam strip resistance and time course change in the final balk polymer.

On the other hand, there is also known a rubber composition containing a polymer whose terminals are modified with a nitrogen-containing compound, and a silica (e.g., JP-A No. 64-22940). According to this publication, in obtaining a diene polymer by using an alkyl lithium as an initiator, a monomer containing a nitrogen atom is used for copolymerization at the terminal side of polymerization, or the diene polymer is modified, at its terminal, with a compound such as aminobenzophenone. However, the resultant polymer is also a polymer in which only one side of the terminals is modified with the nitrogen-containing compound, similarly to those mentioned above. Thus, the reinforcing effect on the silica is unsatisfactory.

A rubber composition containing, together with a silica, a butadiene/styrene rubber which has a specific structure and which is obtained by solution polymerization is also provided (pnuematic tires, e.g., in JP-A No. 3-239737). This is not satisfactory, either, although the reinforcement by the silica is somewhat improved.

These polymers mainly contain diene polymers, which have low affinity with a silica and are difficult to be made into uniformly dispersed rubber compositions by means of kneading. To compensate this disadvantage, an expensive silane coupling agent is incorporated in a large amount, in most of the cases. Since the silane coupling agent is readily hydrolyzed in an atmosphere, it needs to be handled with care and is difficult to be made into rubber compositions with satisfactory reproducibility.

Accordingly, the inventors previously concentrated their energies on developing the method for producing a rubber composition, and then the inventors previously proposed in JP-A No. 1-188501 (first published in 1979), a method for improving the properties of a silica-incorporating rubber composition in which a silica is mixed in a solvent with a polymer in which a specific modifier is employed. By using this method, affinity and dispersability of a diene polymer with the silica, break characteristics and wearing resistance are improved, as compared with the methods using conventional silane coupling agents. Nevertheless, further improved properties of the rubber compositions for tire treads are demanded in response to increasingly advanced performance of recent automobiles.

SUMMARY OF THE INVENTION

The inventors have made much effort in modifying the above-mentioned method to provide a method for producing a rubber composition having various improved physical properties.

Accordingly, an object of the present invention is to provide a method for producing a rubber composition having a low hysteresis loss (low rolling resistance, low gas mileage) and having various physical properties such as wet grip property, break characteristics, wearing resistance and processability which are satisfactorily well-balanced.

The inventors have found that, by modifying a terminal of a specific polymer with a silane modifier having a specific functionality, a method can be obtained for producing a rubber composition having a low hysteresis loss (low rolling resistance, low gas mileage) and satisfactorily well-balanced physical properties. As a result the present invention has been established.

Thus, a method for producing a rubber composition according to the present invention comprises:

the step wherein a conjugated diene monomer, or a conjugated diene monomer/a vinyl aromatic hydrocarbon monomer are polymerized by using an organic lithium initiator;

the step wherein an active terminal of the polymer or copolymer thus obtained is modified with a modifier represented by the general formula (I) shown below and having reactivity with a silica surface; and, the step wherein the terminally-modified polymer or terminally-modified copolymer thus obtained is mixed with a silica in an organic solvent.

General Formula (I)

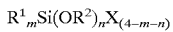

$$R^1{}_m Si(OR^2)_n X_{(4-m-n)}$$

wherein $R^1$ denotes a substituent having an epoxy group or an unsaturated carbonyl group, X denotes an alkyl group or a halogen atom, $R^2$ denotes a group selected from the group consisting of aliphatic, alicyclic and aromatic hydrocarbons of 1 to 20 carbon atoms, m denotes an integer from 1 to 3, n denotes an integer from 1 to 3 and m+n is an integer from 2 to 4.

The achievement of the above-mentioned object is possibly due to reactivity of the filler silica surface with the alkoxy functionality supplied by the modifier to the polymer, as well as due to high affinity of hydroxyl groups formed by the reaction of the substituted epoxy group or unsaturated carbonyl group with silanol groups on the silica surface.

PREFERRED EMBODIMENTS OF THE INVENTION

In the first step of the method according to the present invention, a conjugated diene monomer or a conjugated diene monomer/a vinyl aromatic hydrocarbon monomer are polymerized using an organic lithium initiator. The conjugated diene monomer may be a conjugated diene hydrocarbon having in its molecule 4 to 12 carbon atoms, preferably 4 to 8 carbon atoms. For example, 1,3-butadiene, isoprene, 2,3-dimethyl-1,3-butadiene, 1,3-pentadiene, octadiene and the like may be employed alone or in a mixture thereof, and 1,3-butadiene and isoprene are particularly preferred.

The vinyl aromatic hydrocarbon monomer for forming a copolymer together with the conjugated diene monomer includes, for example, styrene, α-methylstyrene, p-methylstyrene, o-methylstyrene, p-butylstyrene, vinyl naphthalene and the like, and styrene is particularly preferred.

The organic lithium compound used herein as an initiator may be alkyl lithium such as n-butyl lithium, sec-butyl lithium, ethyl lithium, propyl lithium, t-butyl lithium and hexyl lithium, alkylene dilithium such as 1,4-dilithiobutane, other lithiohydrocarbon such as phenyl lithium, stilbene dilithium and reaction products of butyl lithium and divinyl benzene, or organic lithiometals such as lithium tributyltin, lithium amides such as lithium diethylamide, N-methylbenzyl lithium amide, dioctyllithium amide, lithium piperidide, lithium pyrrolidide and lithium hexamethylene imide, and organic lithium compounds including tertiary amine lithiums such as dimethylaminopropyl lithium and diethylaminopropyl lithium.

These organic lithium initiators may be employed alone or in a mixture thereof. The method for initiating polymerization using the organic lithium initiator may be a method wherein the polymerization is initiated by adding a monomer to a system containing a lithium amide initiator obtained from a secondary amine compound such as diethylamine or an imine compound such as hexamethylene imine and an organic lithium compound, a method wherein the polymerization is proceeded by adding a secondary amine compound or an imine compound to a system containing a monomer and an organic lithium compound to obtain a lithium amide catalyst as an initiator, or a method wherein the polymerization is initiated using only an organic lithium compound (for example butyllithium) without using a secondary amine compound or an imine compound.

The secondary amine compound used together with the lithium initiator includes, for example, dimethylamine, diethylamine, dipropylamine, di-n-butylamine, diisobutylamine, dipentylamine, dihexylamine, diheptylamine, dioctylamine, diallylamine, dicyclohexylamine, butylisopropylamine, dibenzylamine, methylbenzylamine, methylhexylamine and ethylhexylamine. Among them, an amine having a group selected from aliphatic hydrocarbon groups of 1 to 10 carbon atoms is preferable in view of further improvement in break characteristics and low hysteresis loss.

The imine compound mentioned above includes, for example, aziridine, azetidine, pyrrolidine, piperidine, 2-methylpiperidine, 3-methylpiperidine, 4-methylpiperidine, 3,5-dimethylpiperidine, 2-ethylpiperidine, hexamethyleneimine, heptamethyleneimine, coniine, morpholine, N-methylpiperazine, N-ethylpiperazine, N-methylimidazoline, N-ethylimidazoline, oxazine, pyrroline, pyrrole and azepine. Among them, a group selected from imine compound residue of 4 to 12 carbon atoms is preferable in view of further improvement in break characteristics and low hysteresis loss.

Among the initiators listed above, n-butyllithium or sec-butyllithium is a preferred alkyllithium in view of solubility in hydrocarbon solvents and initiation rate, for example, in cases where such alkyllithium is employed as an initiator, simultaneously with a secondary amine compound or imine compound. On the other hand, in cases where a lithiumamide initiator is employed from the beginning, lithium hexamethyleneimide, lithium pyrrolidide and lithium diethylamide are preferred in view of solubility in hydrocarbon solvents and reinforcing effect on a silica.

The amount of the lithium compound is 0.2 to 30 mmol per 100 g of a monomer. An amount less than 0.2 mmol or more than 30 mmol results in a polymer having unsatisfactory processability.

A conjugated diene polymer obtained in this step is preferably polybutadiene, which has an excellent wearing resistance. A conjugated diene/a vinyl aromatic hydrocarbon copolymer is preferably butadiene/styrene copolymer, which has an excellent wearing resistance and aging resistance.

The microstructure (i.e., cis-1,4-, trans-1,4, vinyl) of the butadiene moiety of a conjugated diene copolymer, for example, polybutadiene and butadiene/styrene copolymer is not particularly limited; However, it may usually be one formed when an organic lithium catalyst system is used.

The concentration of a monomer in a solvent is usually 5 to 50% by weight, preferably 10 to 35% by weight. In a case of a copolymer of a conjugated diene and a vinyl aromatic hydrocarbon, the vinyl aromatic hydrocarbon content in the monomer mixture charged is 5 to 70% by weight, preferably 10 to 50% by weight.

Although the composition or ratio of a conjugated diene/a vinyl aromatic hydrocarbon copolymer, for example, butadiene/styrene copolymer, is not particularly limited, a weight ratio of 30/70 to 95/5 is usually employed. The composition distribution of the copolymer may be a random distribution, a block distribution or an intermediate distribution between them, with a random or intermediate distribution, being usually preferred.

In the second step in the method for producing according to the present invention, the polymer or copolymer (hereinafter referred to as (co)polymer, as appropriate) obtained as described above is modified with a modifier represented by the general formula (I) shown below.

General Formula (I)

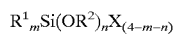

$$R^1{}_m Si(OR^2)_n X_{(4-m-n)}$$

The modifier represented by the general formula (I) shown above is a silane compound having an epoxy or glycidoxy group or equivalent, and in the formula $R^1$ is a substituent having an epoxy group or an unsaturated carbonyl group. Preferably the number of carbon atoms of R' is from 3 to 20.

X denotes an alkyl group (preferably of 1 to 20 carbon atoms) or halogen atom, and $R^2$ denotes a group selected from aliphatic, alicyclic and aromatic hydrocarbon groups of 1 to 20 carbon atoms. $R^2$ is preferably a group selected from aliphatic, alicyclic and aromatic hydrocarbon groups of 1 to 13 carbon atoms. The aliphatic and alicyclic hydrocarbon groups are preferably those selected from aliphatic and alicyclic hydrocarbon groups, each of which has 1 to 6 carbon atoms in view of further improvement in break characteristics and low hysteresis loss. An alkyl group of 1 to 3 carbon atoms is more preferred in view of reactivity with a silica surface. The aromatic hydrocarbon group may be, for example, phenyl, naphthyl, biphenyl, anthryl and phenanthryl, with phenyl being preferred. Among those described above, the most preferable group is that selected from methyl, ethyl, propyl and phenyl, which are capable of further improving break characteristics and low hysteresis loss.

m denotes an integer from 1 to 3, n denotes an integer from 1 to 3 and m+n is an integer from 2 to 4. m and n may vary within the range meeting the above-mentioned provision depending on a production condition and are not particularly limited. Both of a pure compound whose "m" and "n" are fixed and a mixture of compounds whose "m"s and "n"s are different to each other may be used in the method according to the present invention.

A preferred formula of the general formula (I) is the following general formula (Ia):

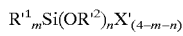

wherein $R'^1$ denotes a group selected from the group consisting of γ-glycidoxyethyl, γ-glycidoxypropyl, γ-glycidoxybutyl, γ-methacryloxymethyl, γ-methacryloxyethyl, γ-methacryloxypropyl, β-(3,4-epoxycyclohexyl)ethyl and β-(3,4-epoxycyclohexyl)propyl, X' denotes an alkyl group of 1 to 20 carbon atoms or a halogen atom, $R'^2$ denotes a group selected from the group consisting of methyl, ethyl, propyl, butyl, phenyl, naphthyl, biphenyl, anthryl and phenanthryl, m denotes an integer from 1 to 3, n denotes an integer from 1 to 3 and m+n is an integer from 2 to 4.

The modifier represented by the general formula (I) includes, for example, γ-glycidoxyethyl trimethoxysilane, γ-glycidoxypropyl trimethoxysilane, γ-glycidoxybutyl trimethoxysilane, γ-glycidoxypropyl triethoxysilane, γ-glycidoxypropyl tripropoxysilane, γ-glycidoxypropyl tributoxysilane, γ-glycidoxypropyl triphenoxysilane, γ-glycidoxypropyl methyldimethoxysilane, γ-glycidoxypropyl ethyldimethoxysilane, γ-glycidoxypropyl ethyldiethoxysilane, γ-glycidoxypropyl methyldiethoxysilane, γ-glycidoxypropyl methyldipropoxysilane, γ-glycidoxypropyl methyldibutoxysilane, γ-glycidoxypropyl methyldiphenoxysilane, γ-glycidoxypropyl dimethylmethoxysilane, γ-glycidoxypropyl diethylethoxysilane, γ-glycidoxypropyl dimethylethoxysilane, γ-glycidoxypropyl dimethylphenoxysilane, γ-glycidoxypropyl diethylmethoxysilane, γ-glycidoxypropyl methyldiisopropenoxysilane, bis(γ-glycidoxypropyl)dimethoxysilane, bis(γ-glycidoxypropyl)diethoxysilane, bis(γ-glycidoxypropyl)dipropoxysilane, bis(γ-glycidoxypropyl)dibutoxysilane, bis(γ-glycidoxypropyl)diphenoxysilane, bis(γ-glycidoxypropyl)methylmethoxysilane, bis(γ-glycidoxypropyl)methylethoxysilane, bis(γ-glycidoxypropyl)methylpropoxysilane, bis(γ-glycidoxypropyl)methylbutoxysilane, bis(γ-glycidoxypropyl)methylphenoxysilane, tris(γ-glycidoxypropyl)methoxysilane, γ-methacryloxypropyl trimethoxysilane, γ-methacryloxypropyl triethoxysilane, γ-methacryloxymethyl trimethoxysilane, γ-methacryloxyethyl triethoxysilane, bis(γ-methacryloxypropyl)dimethoxysilane, tris(γ-methacryloxypropyl)methoxysilane, β-(3,4-epoxycyclohexyl)ethyl-trimethoxysilane, β-(3,4-epoxycyclohexyl)ethyl-triethoxysilane, β-(3,4-epoxycyclohexyl)ethyl-tripropoxysilane, β-(3,4-epoxycyclohexyl)ethyl-tributoxysilane, β-(3,4-epoxycyclohexyl)ethyl-triphenoxysilane, β-(3,4-epoxycyclohexyl)propyl-trimethoxysilane, β-(3,4-epoxycyclohexyl)ethyl-methyldimethoxysilane, β-(3,4-epoxycyclohexyl)ethyl-ethyldimethoxysilane, β-(3,4-epoxycyclohexyl)ethyl-ethyldiethoxysilane, β-(3,4-epoxycycloexyl)ethyl-methyldiethoxysilane, β-(3,4-epoxycyclohexy)ethyl-methyldipropoxysilane, β-(3,4-epoxycyclohexyl)ethyl-methyldibutoxysilane, β-(3,4-epoxycyclohexyl)ethyl-methyldiphenoxysilane, β-(3,4-epoxycyclohexyl)ethyl-dimethylmethoxysilane, β-(3,4-epoxycyclohexyl)ethyl-diethylethoxysilane, β-(3,4-epoxycyclohexyl)ethyl-dimethylethoxysilane, β-(3,4-epoxycyclohexyl)ethyl-dimethylpropoxysilane, β-(3,4-epoxycyclohexyl)ethyl-dimethylbutoxysilane, β-(3,4-epoxycyclohexyl)ethyl-dimethylphenoxysilane, β-(3,4-epoxycyclohexyl)ethyl-diethylmethoxysilane, β-(3,4-epoxycyclohexyl)ethyl-methyldiisopropenoxysilane and the like. Among them, γ-glycidoxypropyl trimethoxysilane and γ-methacryloxypropyl trimethoxysilane are preferable since they further improve the physical properties such as wearing resistance as well as low hysteresis loss.

The amount of a modifier used is 0.1 to 10 molecules, preferably 0.2 to 3 molecules per one lithium atom. An amount departing from the range specified above results in reduced reaction efficiency of the silica, which may cause poor dispersion of the silica.

The polymerization reaction and the reaction between the polymeric active terminals and a modifier, described above, may be conducted at a constant temperature or temperature being elevated gradually, preferably within the range from 0 to 150° C.

The polymerization reaction is conducted by allowing a monomer in a liquid phase to be in contact with a catalyst under a pressure sufficient to keep the liquid phase. All materials to be included in the reaction system are preferably free from the substances interfering the catalytic effect. The reaction conducted with an added modifier after polymerization should be maintained in an atmosphere in which the active terminals of a (co)polymer are not inactivated.

In this method, the organic solvent employed as a polymerization solvent includes aromatic hydrocarbon solvents such as benzene, toluene and xylene, aliphatic hydrocarbon solvents such as n-pentane, n-hexane, n-butane, 1-methylbutene, heptane and octane, alicyclic hydrocarbon solvents such as methylcyclopentane and cyclohexane and mixture thereof. Any of solvents capable of dissolving or dispersing the (co)polymer mentioned above uniformly may be employed without particular limitation.

In this polymerization, when a (co)polymer having a specific molecular structure is desired, a randomizer is preferably employed. The randomizer herein means a compound having the functions to control the microstructure of the conjugated diene polymer, for example, to increase the rate of 1,2-bonds in the butadiene moiety of a butadiene polymer or butadiene/styrene copolymer, or the ratio of 3,4-bonds of an isoprene polymer and to control the composition distribution of the monomer units of a conjugated diene/a vinyl aromatic hydrocarbon copolymer, for example, to randomize the butadiene units and styrene units of a butadiene/styrene copolymer.

The randomizer which may be used iu the present invention is not particularly limited, and all those employed usually may be included. Examples of the randomizers are listed below.

(1) Ethers (2) o-Dimethoxybenzenes (3) Complexes of an alkaline metal with a ketone or triphosphite (4) Compounds represented by the general formula shown below

wherein R is selected from aliphatic, alicyclic and aromatic hydrocarbons, $M^1$ is an alkaline metal, particularly lithium, sodium, potassium, rubidium or cesium, $M^2$ is an alkaline earth metal, typically calcium or barium, and n is an integer of 1 to 3.

(5) Tertiary amines

The randomizers are detailed below and they may be employed alone or in a mixture thereof.

(1) Examples of the ethers include 1,2-dimethoxyethane, 1,2-diethoxyethane, tetrahydrofurane, 2-methoxymethyl tetrahydrofurane, diethylether, triethyleneglycol dimethyl ether and the like.

(2) Examples of the o-dimethoxybenzenes are veratrol and isohomoveratrol.

(3) Examples of a complex of an alkaline metal with a ketone or triphosphite are complexes of lithium, sodium, potassium, rubidium and cesium with a ketone such as acetone, methyl ethyl ketone, diisopropyl ketone, benzophenone, acetophenone, dibenzyl ketone, fluorenone, xthantone, Michler's ketone and acetylacetone or with a trphosphite such as triethyl phosphate, trioctyl phosphate, tribenzyl phosphate and trinonyl phosphate.

(4) The randomizers represented by the general formula are detailed below.

Examples of alkaline metal salts or alkaline earth metal salts of alcohols and phenols, represented by the general formulas $R(OM^1)_n$ and $(RO)_2M^2$ are lithium, sodium, potassium, rubidium, cesium, calcium and barium salts of methyl alcohol, ethyl alcohol, isopropyl alcohol, t-butyl alcohol, t-amyl alcohol, cyclohexyl alcohol, allyl alcohol, 2-butenyl alcohol, benzyl alcohol, phenol, catechol, resorcinol, hydroquinone, 1-naphthyl alcohol, p-nonyl phenol, pyrogallol and the like.

Examples of the carboxylate and acidic carbonate salts of the alkaline metals, represented by the general formulas $R(COOM^1)_n$ and $ROCOOM^1$ are lithium, sodium, potassium, rubidium and cesium salts of isovaleric acid, lauric acid, palmitic acid, stearic acid, oleic acid, rosin acid, benzoic acid, pimelic acid, acidic n-dodecyl carbonate and acidic phenyl carbonate.

Examples of the sulfonates and sulfates of the alkaline metals, represented by the general formulas $RSO_3M^1$ and $ROSO_3M^1$ include lithium, sodium, potassium, rubidium and cesium salts of dodecylbenzene sulfonate, diisopropyl-naphtharene sulfonate, N-methyl-N-methanesulfonate laurylamide, sulfate salt of lauryl alcohol and caproyl ethylene glycol sulfate.

(5) Examples of tertiary amines are triethylamine and tetramethyl ethylenediamine.

Among them, preferable randomizers are ethers in section (1) and $R(OM^1)_n$ compounds in section (4) listed above, especially with which the molecular structure of a rubber composition obtained by the present method can readily be controlled.

The amount of a randomizer used is within the range from 0.01 to 1000 molar equivalents per molar equivalent of an organic lithium compound.

In the third step in the method according to the present invention, after completion of modification reaction of the terminally-modified (co)polymer obtained mentioned above, the (co)polymer allowed to remain in the above-mentioned organic solvent, i.e., the polymerization solvent, or the polymerization solvent is removed and the organic solvent listed above is newly added and the terminally-modified (co)polymer is dissolved therein. Into the system, a silica in a required amount is added. In the method according to the present invention, it is important to mix the silica with the (co)polymer in the presence of the organic solvent, in view of uniform dispersion of the silica and reactivity with the (co)polymer.

The silica employed in the method for producing a rubber composition according to the present invention includes, for example, silicon compounds such as wet silica (hydrated silicic acid), dry silica (anhydrous silicic acid), calcium silicate and aluminium silicate. A wet silica is preferable since it provides improvement in break characteristics while providing both of high grip property and low rolling resistance simultaneously.

The amount of a silica incorporated is 10 to 100 parts by weight per 100 parts by weight of the terminally-modified (co)polymer described above, and preferably 20 to 60 parts by weight in view of the reinforcement by the silica and efficiency of accompanying improvement in various physical properties. An amount less than 10 parts by weight results in unsatisfactory break characteristics, while an amount exceeding 100 parts by weight causes poor processability.

Mixture of the silica with the terminally-modified (co) polymer is conducted by reacting the (co)polymer with the silica well, at a temperature of 0 to 150° C., preferably 50 to 130° C.

A filler to be added to a rubber composition produced by the method according to the present invention may exclusively be the silica incorporated herein. In such case, the silica is employed in an amount of 10 to 100 parts by weight based on 100 parts by weight of the entire rubber material containing the terminally-modified (co)polymer, and preferably 20 to 60 parts by weight, in view of reinforcement and accompanying improvement in various physical properties. An amount less than 10 parts by weight results in unsatisfactory break characteristics, while an amount exceeding 100 parts by weight causes poor processability.

Alternatively, a carbon black may also be employed as a filler in addition to the silica. In such case, enhanced improvement in various physical properties can be obtained. The carbon black to be employed includes carbon blacks such as FEF, SRF, HAF, ISAF, SAF and the like, and preferably those having a iodine absorption (IA) of 60 mg/g or more and dibutylphthalate oil absorption value (DBP) of 80 ml/100 g or more. HAF, ISAF and SAF having an excellent wearing resistance are particularly preferred. The amount of a carbon black to be incorporated is not particularly limited provided that the effect of the silica is exhibited. It is however preferable in view of reinforcement and processability to incorporate from 0.1 to 90 parts by weight of the carbon black and from 10 to 99.9 parts by weight of the silica into 100 parts by weight of a starting rubber.

When mixing the silica with the above-mentioned (co)polymer, a filler such as the carbon black and a process oil may be added to the mixture in the presence of organic solvents.

The process oil which may be employed in the present invention includes, for example, paraffin oils, naphthene oils and aromatic oils. The aromatic oils are used in cases where high tensile strength and wearing resistance are important, while the naphthene and paraffin oils are used in cases where low hysteresis loss and low temperature characteristics are important. The amount used is 0 to 100 parts by weigh per 100 parts by weight of the (co)polymer. An amount exceeding 100 parts by weight markedly affects the tensile strength and low hysteresis loss of a vulcanized rubber finally obtained adversely.

After mixing and reaction of the (co)polymer and the silica, the solvent is removed to obtain a master batch rubber composition according to the present invention. The solvent may be removed, for example, by purging with steam, by adding a poor solvent such as methanol into the reaction system to solidify the polymer followed by drying with a thermal roll or under reduced pressure, or by subjecting the polymer solution directly to the thermal roll or reduced pressure, according to conventional procedures.

The Mooney viscosity ($ML_{1+4}$, 100° C.) of the master batch rubber composition thus obtained is preferably within the range from 20 to 200. A Mooney viscosity less than 20 results in poor tensile strength and affects break characteristics adversely, while that exceeding 200 causes problems with regard to processability.

The master batch rubber composition thus obtained according to the present method may be optionally blended with natural rubbers or other synthetic rubbers, together with other additives and vulcanizing agents, as desired.

When blending with the natural rubbers or other synthetic rubbers, the master batch rubber composition should be contained in an amount of 10 parts by weight or more per 100 parts by weight of the entire rubber material employed for the rubber composition, and preferably in an amount of 40 parts by weight or more for the purpose of realizing the advantageous effect of the polymer according to the present invention sufficiently. For example, in a blend with a natural rubber, the polymer obtained by the present invention in an amount less than 10 parts by weight affects the balance of necessary properties of a rubber composition adversely.

The synthetic rubber which may be blended is cis-1,4-polyisoprene, styrene/butadiene copolymer, low cis-1,4-polybutadiene, high cis-1,4-polybutadiene, ethylene/propylene/diene copolymer, chloroprene, halogenated butyl rubber, acrylonitrile/butadiene rubber (NBR) and the like. Among them, it is preferable to blend a natural rubber, high cis-1,4-polybutadiene and halogenated butyl rubber in view of tensile strength, wearing resistance and processability.

In the rubber composition obtained according to the present method, a silane coupling agent is incorporated in order to further improve the reinforcing effect of a silica.

The examples of the silane coupling agent are listed below.
Bis(3-triethoxysilylpropyl)tetrasulfide,
bis(2-triethoxysilylethyl)tetrasulfide,
bis(3-trimethoxysilylpropyl)tetrasulfide,
bis(2-trimethoxysilylethyl)tetrasulfide,
3-mercaptopropyltrimethoxysilane,
3-mercaptopropyltriethoxysilane,
2-mercaptoethyltrimethoxysilane,
2-mercaptoethyltriethoxysilane,
3-nitropropyltrimethoxysilane,
3-nitropropyltriethoxysilane,
3-chloropropyltrimethoxysilane,
3-chloroporpyltriethoxysilane,
2-chloroethyltrimethoxysilane,
2-chloroethyltriethoxysilane,
3-trimethoxysilylpropyl-N,N-dimethylthiocarbamoyltetrasulfide,
3-triethoxysilylpropyl-N,N-dimethylthiocarbamoyltetrasulfide,
2-triethoxysilylethyl-N,N-dimethylthiocarbamoyltetrasulfide,
3-trimethoxysilylpropylbenzothiazole tetrasulfide,
3-trlethoxysilylpropylbenzothiazole tetrasulfide,
3-triethoxysilylpropylmethacrylate monosulfide,
3-trimethoxysilyipropylmethacrylate monosulfide and the like.

Bis(3-triethoxysltylpropyl)tetrasulfide and 3-trimethoxysilylpropylbenzothiazole tetrasulfide are preferred in view of the reinforcement improving effect.

Other examples are
bis(3-diethoxymethylsilylpropyl)tetrasulfide,
3-mercaptopropyldimethoxymethylsilane,
3-nitropropyldimethoxymethylsilane,
3-chloropropyldimethoxymethylsilane,
dimethoxymethylsilylpropyl-N,N-dimethylthiocarbamoyltetrasulfide and dimethoxymethylsilylpropylbenzothiazole tetrasulfide.

When a silane coupling agent is incorporated in a rubber composition obtained according to the present method, the amount of the agent may be smaller than a conventional amount for maintaining the equivalent physical properties. In view of the reinforcement, the amount may be 0.1 to 10 parts by weight, preferably 0.1 to 5 parts by weight per 100 parts by weight of the rubber material although it may vary depending on the amount of the silica incorporated.

A vulcanizing agent employed in a rubber composition obtained according to the present invention may be sulfur and the like, which is employed in an amount of 0.1 to 5 parts by weight, preferably 1 to 2 parts by weight per 100 parts by weight of the rubber material. An amount less than 0.1 parts by weight results in affecting break strength, wearing resistance and hysteresis loss of a vulcanized rubber adversely, while an amount exceeding 5 parts by weight causes loss of rubber elasticity.

A vulcanization accelerator which can be employed in the present invention is not particularly specified, and may preferably be thiazoles such as M (2-mercaptobenzothiazole), DM (dibenzothiazylsulfide) and CZ (N-cyclhexyl-2-benzothiazylsulfenamide) as well as guanidines such as DPG (diphenylguanidine), any of which may be used in an amount of 0.1 to 5 parts by weight, preferably 0.2 to 3 parts by weight per 100 parts by weight of the rubber material.

This rubber composition may contain, in addition to those described above, additives usually employed in the rubber industries such as anti-aging agent, zinc oxide, stearic acid, antioxidants and anti-ozone degradation agent.

In the method according to the present invention, after incorporating the components described above, a kneader such as a roll and an internal mixer may be used to yield a rubber composition.

The rubber composition thus obtained may be molded and vulcanized and then used in tire components such as tire treads, under treads, carcasses, side walls and bead parts, as well as in other industrial materials such as vibration proof rubbers, belts and hoses. In particular, it is used preferably as a rubber for a tire tread.

EXAMPLES

The present invention will be further described in the following examples, which are not intended to restrict the present invention.

In the examples, parts and percents are ones by weight unless otherwise specified.

Measurements were conducted as follows.

The microstructure of the butadiene moiety of a polymer was determined by infrared method (Morero method). The bound styrene content in a butadiene/styrene copolymer was calculated based on the ratio of integrated values from $^1$H-NMR spectrum.

Compound Mooney ($ML_{1+4}$) was determined at 128° C. according to JIS K6300.

As an index of hysteresis loss, tan δ was employed. A composition having a lower tans was regarded as that having a lower hysteresis loss. The value of tan δ was determined using a rheometer (Rheometrix) at the temperature of 50° C. with the strain of 8% and the frequency of 15 Hz.

Physical property (tensile strength at break, extension at break) and 300% modulus ($M_{300}$) were determined according to JIS K6301.

Wearing resistance was determined by measuring an amount of wearing at the slip rate of 60% at a room temperature using a Lambourn type wearing tester. Wearing resistance index was represented as a value based on the wearing resistance of the vulcanized rubber obtained from Polymer C in Comparative Example 1 being 100. A greater index reflects a better result.

Example 1
Synthesis of Polymer A and Preparation of Master Batch A

In a 5 liter reaction vessel which was dried and purged with nitrogen, 2000 g of cyclohexane, 400 g of 1,3-butadiene monomer, 100 g of styrene monomer and 10 g of tetrahydrofurane were charged and then the solution was heated to 40° C., and 0.32 g of n-butyllithium was added thereinto to initiate polymerization. After checking the peak temperature of the polymerization and reduction in pressure, 7-glycidoxypropyltrimethoxysilane (GPMOS) as a modifier was added in the amount equimolar to n-butyllithium (1.18 g), and then the reaction was further proceeded for 30 minutes.

About a half of the copolymer solution was taken as a sample, and an antioxidant di-t-butyl-p-cresol was added thereinto in the amount of 0.5 g per 100 g of the copolymer. Then the solution was dried to remove the solvent in a conventional manner to obtain the copolymer composition designated as Polymer A.

To 100 parts by weight of the remainder of the copolymer solution, 50 parts by weight of a silica (VN3: Tradename, Nippon Silica) was admixed and the mixture was stirred at a room temperature for about 1 hour thereby reacting the terminals of the copolymer with the silica. Finally, di-t-butyl-p-cresol was added thereinto in the amount of 0.5 g per 100 g of the copolymer, and the solution was dried to remove the solvent in a conventional manner to obtain the terminally-modified copolymer composition designated as Master batch A.

The microstructure of this copolymer was represented by the styrene content of 20% by weight and the vinyl content of 50% by weight for the total butadiene unit.

Example 2
Synthesis of Polymer B and Preparation of Master Batch B

Polymer B and Master batch B were obtained similarly as in Example 1 except for adding 1.24 g of γ-methacryloxypropyl trimethoxysilane (γ-MS) as a modifier instead of GPMOS.

The microstructure of this copolymer was represented by the styrene content of 21% by weight and the vinyl content of 49% by weight.

Comparative Example 1
Synthesis of Polymer C and Preparation of Master Batch C Polymer C and Master batch C were obtained similarly as in Example 1 except for adding no modifier GPMOS.

The microstructure of this copolymer was represented by the styrene content of 21 wt. % and the vinyl content of 51 wt. %.

To each of the polymers and master batches obtained as described above, various additives were incorporated in the amounts shown in Table 1, and kneaded and then vulcanized for 30 minutes at 140° C. to prepare a vulcanized rubber. The physical properties of the vulcanized rubbers thus obtained were evaluated and the results are shown in Table 2.

Comparative Example 2
Synthesis of Polymer D and Preparation of Master Batch D Polymer D and Master batch D were obtained similarly as in Example 1 except for adding 0.89 g of methyltriethoxysilane instead of GPMOS.

The microstructure of this copolymer was represented by the styrene content of 20 wt. % and the vinyl content of 51 wt. %

To each of the polymers and master batches obtained as described above, various additives were incorporated in the amounts shown in Table 1, and kneaded and then vulcanized for 30 minutes at 140° C. to prepare a vulcanized rubber. The physical properties of the vulcanized rubbers thus obtained were evaluated and the results are shown in Table 2 .

TABLE 1

| | |
|---|---|
| Polymer + silica or Master batch | 150*[1] (parts by weight) |
| Stearic acid | 2 |
| Antioxidant*[2] | 1 |
| Zinc oxide | 3 |
| Aromatic oil | 15 |
| Vulcanization accelerator (DPG*[3]) | 0.8 |
| Vulcanization accelerator (DM*[4]) | 1.2 |
| Sulfur | 2.0 |

*[1]Polymer 100 parts + silica 50 parts
*[2]Di-t-butyl-p-cresol
*[3]Diphenylguanidine
*[4]Dibenzothiazyl disulfide

TABLE 2

| | Example 1 Master Batch A | Example 2 Master Batch B | Comparative Example 1 Polymer A | Comparative Example 2 Polymer B | Comparative Example 3 Master Batch C | Comparative Example 4 Polymer C | Comparative Example 5 Master Batch D | Comparative Example 6 Polymer D |
|---|---|---|---|---|---|---|---|---|
| Mooney viscosity ($ML_{1+4}$) | 65 | 72 | 69 | 76 | 88 | 90 | 73 | 75 |
| Break characteristics | | | | | | | | |
| Tensile strength ($kg/cm^2$) | 220 | 250 | 205 | 240 | 181 | 180 | 210 | 200 |
| Extension % | 490 | 450 | 475 | 440 | 530 | 550 | 500 | 510 |
| 300% Modulus ($kg/cm^2$) | 90 | 100 | 87 | 98 | 62 | 58 | 78 | 74 |
| tan δ 50° C. | 0.09 | 0.07 | 0.09 | 0.08 | 0.13 | 0.14 | 0.10 | 0.10 |
| Wearing resistance index | 119 | 120 | 117 | 118 | 101 | 100 | 112 | 110 |

As evident from Table 2, the rubber compositions obtained by the present method had excellent break characteristics, modulus, wearing resistance and low hysteresis loss (tan δ: 50° C.) as well as well-balanced physical properties including processability, while they exhibited increased values of compound Mooney.

The vulcanized rubbers obtained from Polymers A and B which were the copolymers before incorporation of the silica also exhibited excellent properties as shown in Table 2, and the vulcanized rubbers obtained from Master batches A and B after incorporation of the silica exhibited further improved properties, indicating that the disadvantages involved in the conventional silica incorporation were eliminated.

In addition, as compared with Comparative Examples master batch C and polymer C in which any modifier to be used in the present invention was not employed, master batches of the Examples described above had lower Mooney viscosity and yielded vulcanized rubbers having higher tensile strength and lower tan δ, indicating excellent processability and break characteristics and satisfactorily low hysteresis loss.

Also as compared with Comparative Examples master batch D and polymer D in which a conventional modifier was used, the Examples exhibited improvement in all items of processability, break characteristics and low hysteresis loss, and were especially excellent with regard to break characteristics.

According to the method for producing a rubber composition according to the present invention, a rubber composition can be obtained which has high wet grip characteristics, break characteristics and wearing resistance and satisfactorily low hysteresis loss (low rolling resistance, low gas mileage).

What is claimed is:

1. A method for producing a rubber composition comprising the steps of:
   polymerizing a conjugated diene monomer, or a conjugated diene monomer and a vinyl aromatic hydrocarbon monomer by using an organic lithium initiator to form a polymer or copolymer;
   modifying an active terminal of the polymer or copolymer with a modifier capable of having a reactivity with a silica surface and represented by general formula (I) to form a terminally-modified polymer or terminally-modified copolymer; and
   mixing the terminally-modified polymer or terminally-modified copolymer with a silica in the presence of an organic solvent,
wherein general formula (1) is

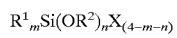

wherein $R^1$ denotes a substituent having an epoxy group or an unsaturated carbonyl group, X denotes an alkyl group or a halogen atom, $R^2$ denotes a group selected from the group consisting of aliphatic, alicyclic and aromatic hydrocarbons of 1 to 20 carbon atoms, m denotes an integer from 1 to 3, n denotes an integer from 1 to 3 and m+n is an integer from 2 to 4.

2. A method for producing a rubber composition comprising the steps of:
   polymerizing a conjugated diene monomer of 4 to 12 carbon atoms, or said conjugated diene monomer and a vinyl aromatic hydrocarbon monomer by using an organic lithium initiator to form a polymer or copolymer;
   modifying an active terminal of the polymer or copolymer with a modifier capable of having a reactivity with a silica surface and represented by general formula (Ia) to form a terminally-modified polymer or terminally-modified copolymer; and
   mixing the terminally-modified polymer or terminally-modified copolymer with a silica in the presence of an organic solvent,
wherein general formula (Ia) is

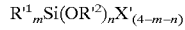

wherein $R'^1$ denotes a group selected from the group consisting of γ-glycidoxyethyl, γ-glycidoxypropyl, γ-glycidoxybutyl, γ-methacryloxymethyl, γ-methacryloxyethyl, γ-methacryloxypropyl, β-(3,4-epoxycyclohexyl)ethyl and β-(3,4-epoxycylohexyl)propyl, X' denotes an alkyl group of 1 to 20 carbon atoms or a halogen atom, $R'^2$ denotes a group selected from the group consisting of methyl, ethyl, propyl, butyl, phenyl, naphthyl, biphenyl, anthryl and phenanthryl, m denotes an integer from 1 to 3, n denotes an integer from 1 to 3 and m+n is an integer from 2 to 4.

3. A method for producing a rubber composition according to claim 1, wherein the polymerization is carried out in a polymerization solvent, and the terminally-modified polymer or terminally modified copolymer is mixed with a silica in the polymerization solvent before its removal.

4. A method for producing a rubber composition according to claim 1, further comprising removing the organic solvent after mixing with silica, and prior to incorporating other additives, kneading and vulcanizing.

5. A method for producing a rubber composition according to claim 2, further comprising removing the organic solvent after mixing with silica, and prior to incorporating other additives, kneading and vulcanizing.

6. A method for producing a rubber composition according to claim 3, further comprising removing the organic solvent after mixing with silica, and prior to incorporating the other additives, kneading and vulcanizing.

7. A method for producing a rubber composition according to claim 1, wherein $R^1$ denotes a substituent of 3 to 20 carbon atoms having an epoxy group or an unsaturated carbonyl group.

8. A method for producing a rubber composition according to claim 7, wherein $R^1$ denotes a group selected from the group consisting of γ-glycidoxyethyl, γ-glycidoxypropyl, γ-glycidoxybutyl, γ-methacryloxymethyl, γ-methacryloxyethyl, γ-methacryloxypropyl, β-(3,4-epoxycyclohexyl)ethyl and β-(3,4-epoxycyclohexyl)propyl.

9. A method for producing a rubber composition according to claim 6, wherein X is an alkyl group of 1 to 20 carbon atoms or a halogen atom.

10. A method for producing a rubber composition according to claim 1, wherein $R^2$ is a hydrocarbon group selected from the group consisting of aliphatic, alicyclic and aromatic groups of 1 to 13 carbon atoms.

11. A method for producing a rubber composition according to claim 9, wherein $R^2$ is a hydrocarbon group selected from the group consisting of aliphatic, alicyclic and aromatic groups of 1 to 13 carbon atoms.

12. A method for producing a rubber composition according to claim 1, wherein said modifier having reactivity with a silica surface is γ-glycidoxypropyl trimethoxysilane or γ-methacryloxypropyl trimethoxysilane.

13. A method for producing a rubber composition according to claim 1, wherein the amount of the organic lithium initiator used is from 0.2 to 30 mmol per 100 g of the monomer, the amount of the modifier used is from 0.1 to 10 molecules per lithium atom in the organic lithium initiator, and the amount of the silica incorporated is from 1 to 100 parts by weight per 100 parts by weight of said terminally-modified polymer or terminally modified copolymer.

14. A method for producing a rubber composition according to claim 1, wherein the silica is a wet silica.

15. A method for producing a rubber composition according to claim 1 wherein the rubber composition has a Mooney viscosity ($ML_{1+4}$, 100° C.) within the range from 20 to 200.

16. A method for producing a rubber composition according to claim 1, further comprising the step of mixing a rubber selected from the group consisting of natural rubbers, cis-1,4-polyisoprene, styrene/butadiene copolymer, low cis-1,4-polybutadiene, high cis-1,4-polybutadiene, ethylene/propylene/diene copolymer, chloroprene, halogenated butyl rubber and acrylonitrile/butadiene rubber with said rubber composition.

17. A method for producing a rubber composition according to claim 2, wherein $R'^2$ denotes a group selected from the group consisting of methyl, ethyl, propyl, butyl and phenyl.

18. A method for producing a rubber composition according to claim 2, wherein said conjugated diene monomer is selected from the group consisting of 1,3-butadiene and isoprene.

19. A method for producing a rubber composition according to claim 2, wherein said aromatic vinyl monomer is selected from the group consisting of α-methylstyrene, p-methylstyrene, o-methylstyrene, p-butylstyrene and styrene.

20. A method for producing a rubber composition according to claim 2, wherein said modifier having reactivity with a silica surface is selected from the group consisting of γ-glycidoxypropyl trimethoxysilane and γ-methacryloxypropyl trimethoxysilane.

21. A method for producing a rubber composition according to claim 2, wherein the amount of the organic lithium initiator used is from 0.2 to 30 mmol per 100 g of the monomer, the amount of the modifier used is from 0.1 to 10 molecules per lithium atom in the organic lithium initiator, and the amount of the silica incorporated is from 10 to 100 parts by weight per 100 parts by weight of said terminally-modified polymer or terminally modified copolymer.

22. A method for producing a rubber composition according to claim 2, wherein the silica is a wet silica.

23. A method for producing a rubber composition according to claim 2, wherein the rubber composition has a Mooney viscosity ($ML_{1+4}$, 100° C.) within the range from 20 to 200.

24. A method for producing a rubber composition according to claim 2, further comprising the step of mixing a rubber selected from the group consisting of natural rubbers, cis-1,4-polyisoprene, styrene/butadiene copolymer, low cis-1,4-polybutadiene, high cis-1,4-polybutadiene, ethylene/propylene/diene copolymer, chloroprene, halogenated butyl rubber and acrylonitrile/butadiene rubber with said rubber composition.

* * * * *